(12) United States Patent
Gottlieb

(10) Patent No.: US 8,369,821 B2
(45) Date of Patent: Feb. 5, 2013

(54) LIST-BASED EMERGENCY CALLING DEVICE

(75) Inventor: Mark M. Gottlieb, Fairfax Station, VA (US)

(73) Assignee: Logicmark, LLC, Buffalo Grove, IL (US)

( * ) Notice: Subject to any disclaimer, the term of this patent is extended or adjusted under 35 U.S.C. 154(b) by 680 days.

(21) Appl. No.: 12/402,304

(22) Filed: Mar. 11, 2009

(65) Prior Publication Data

US 2009/0203350 A1    Aug. 13, 2009

Related U.S. Application Data

(63) Continuation-in-part of application No. 11/517,320, filed on Sep. 8, 2006, now abandoned.

(51) Int. Cl.
*H04B 1/38* (2006.01)
*H04M 11/04* (2006.01)

(52) U.S. Cl. ......... 455/404.1; 455/90.1; 379/45; 379/37

(58) Field of Classification Search ................. 455/90.1, 455/90.2, 404.1, 404.2, 564, 565; 379/37, 379/40, 41, 45
See application file for complete search history.

(56) References Cited

U.S. PATENT DOCUMENTS

| | | | | |
|---|---|---|---|---|
| 6,892,751 | B2 * | 5/2005 | Sanders | 137/312 |
| 7,046,985 | B2 * | 5/2006 | Seales et al. | 455/404.1 |
| 2001/0017912 | A1 * | 8/2001 | Baum et al. | 379/37 |
| 2003/0027547 | A1 * | 2/2003 | Wade | 455/404 |
| 2005/0169439 | A1 * | 8/2005 | Binning | 379/45 |

* cited by examiner

*Primary Examiner* — Michael Faragalla
*Assistant Examiner* — Nathan Brittingham
(74) *Attorney, Agent, or Firm* — Patzik, Frank & Samotny Ltd.

(57) ABSTRACT

An emergency services automatic dialing device enables at least one number in a list of alternate numbers to be called prior to dialing an emergency services number (e.g., 911). This enables a user of a corresponding portable transceiver to try to reach someone else (e.g., a family member) before having to resort to calling emergency services (e.g., 911 for fire department, police or ambulance). The dialing device can call several numbers in a list until all the numbers are exhausted before dialing the emergency services number. Calling the list of numbers can also be overridden by pressing a button on the portable transceiver in a particular way.

15 Claims, 3 Drawing Sheets

LIST-BASED EMERGENCY CALLING DEVICE

CROSS-REFERENCE TO CO-PENDING APPLICATIONS

The application is related to, claims priority to and is a continuation-in-part of U.S. patent application Ser. No. 11/517,320, filed Sep. 8, 2006 now abandoned, also naming Mark Gottlieb as the sole inventor. The entire contents of that application are incorporated herein by reference.

FIELD OF INVENTION

The present invention is directed to the field of emergency telephony devices, and in one embodiment to a portable device configurable to interact with a base station to call one or more parties in an emergency situation.

DISCUSSION OF THE BACKGROUND

The Personal Emergency Response System (PERS) market is almost a billion dollar market. 99% of this market is owned by the monitoring industry. In known systems, a user carries around a pendant with a button that causes a base station located in the home to dial the monitoring company when the button is pushed. When the monitoring company receives the call, it receives a digital code from the base station which designates the ID of the customer. The base station then hangs up. The monitoring company then has a person call back to the home phone number of the matching customer to see what the problem is. If the customer can answer the phone—they can explain the emergency. If the customer cannot answer the phone, the monitoring service may call another number on the list of numbers and eventually may call the local police or ambulance service. In some products on the market now, the base station does not hang-up, but engages a speaker phone when the emergency call center picks up. This allows the monitoring company to talk to the person directly without calling back. The big drawback with this arrangement is that it requires the person to be in the same room as the speaker phone base station to communicate.

Some such systems require monthly monitoring fees (e.g., $30 to $50 per month), and often customers who push the button are not able to answer the next incoming call from the monitoring service—and thus unable to explain the nature of the call—medical, police or fire. Thus, the monitoring service often sends the police which may not be the need.

U.S. patent application Ser. No. 10/955,327, filed Sep. 30, 2004 describes a portable, single-button transceiver that includes a speaker and microphone. The transceiver, when activated, causes a corresponding base station to dial the 911 emergency operator, without the need for a monitoring service (and its associated fees). This single button reduces complexity, which may be important for an elderly person in a distressed situation. The transceiver then allows two-way communication between the transceiver and the base station, thus allowing the customer to directly talk to the 911 emergency operator. The person can therefore describe the nature of the emergency.

US Patent Application Publication 2003/0027547 also discloses an emergency communications system including a wireless pendant and a base unit connected by a radio link.

Another company, Telemergency, has a 'no-monthly fee' product. It, however, includes a speakerphone in the base station. Thus, after a user pushes the emergency button, the system is less effective if the user is not within voice proximity of the base station since the user cannot communicate with the emergency operator.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
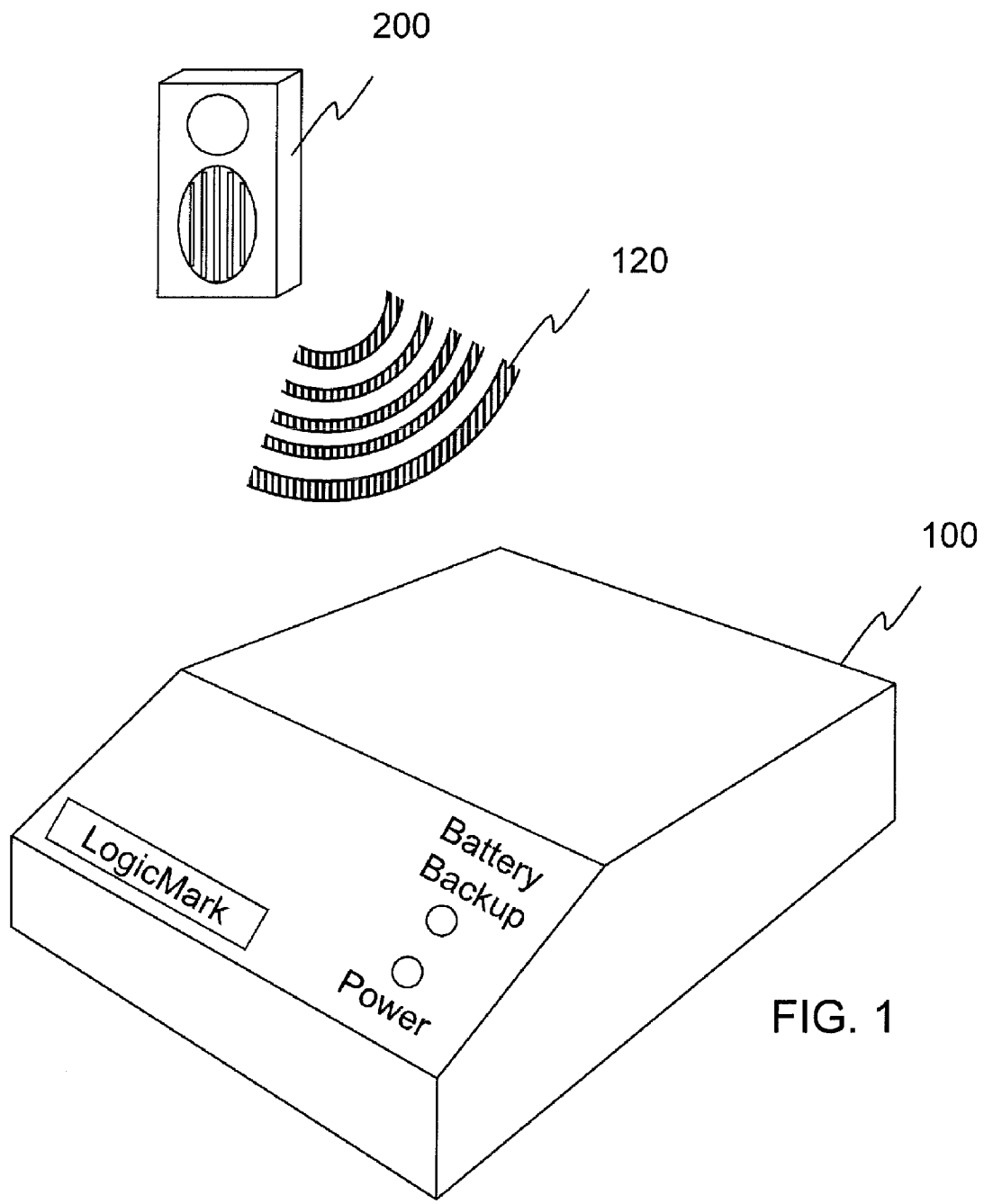
FIG. 1 is a perspective view of an exemplary base station for communicating with an automatically called party.

Turning to FIG. 1, an exemplary base station 100 is illustrated which facilitates communication between a portable transceiver 200 and an automatically called party, such as an emergency services (e.g., 911) operator. The voice and/or data communication between the base station 100 and the portable transceiver 200 is preferably via a wireless communications protocol, using radio frequency (RF) waves 120, such as is used with analog- or digital-cordless telephone handsets, or using other electro-magnetic radiation (e.g., infra-red signals). However, other wireless communications protocols are also possible, such as wireless network-based communications protocols (e.g., Bluetooth and the 802.11 family of protocols (802.11a, 802.11b, 802.11g, 802.11n, etc.). A benefit of such wireless communications protocols is that they are private and no monthly fees are therefore required to use them. As used herein, such communications protocols shall be referred to as "private, non-subscription communications protocols."

The base station may further include indicator lights or LEDs to indicate the status of the base station 100. The power indicator may be a single color (e.g., red) which stays on continuously while the base station is connected to power from an outlet. The battery backup indicator light may be designed to use a second color (e.g., green) and to stay on continuously when the internal rechargeable batteries are fully charged. Alternatively, the battery backup indicator light may blink when the battery back-up is the only power source. Both indicator lights may also blink to indicate that the base station is in "learning" mode, as described in greater detail below.

Figure 2:
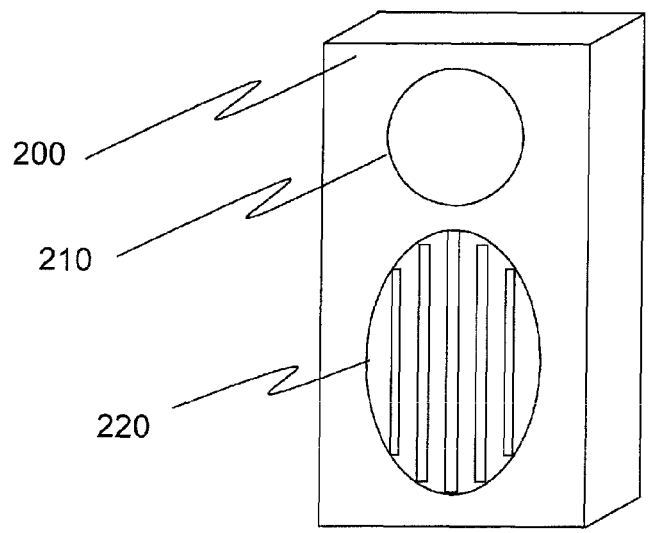
FIG. 2 is an illustration of an exemplary portable device for communicating with an automatically called party.

As shown in FIG. 2, a portable transceiver 200 includes an activation button 210 and a speakerphone 220 (which may be created from a separate microphone and speaker to enable full-duplex voice communication between the transceiver 200 and the base station 100). By pushing the button 210, the transceiver 200 begins communicating with the base station 100 using a private, non-subscription communications protocol such that a user of the portable transceiver may speak with the person(s) answering the telephone number called by the base station 100 upon the call being answered.

Figure 3:
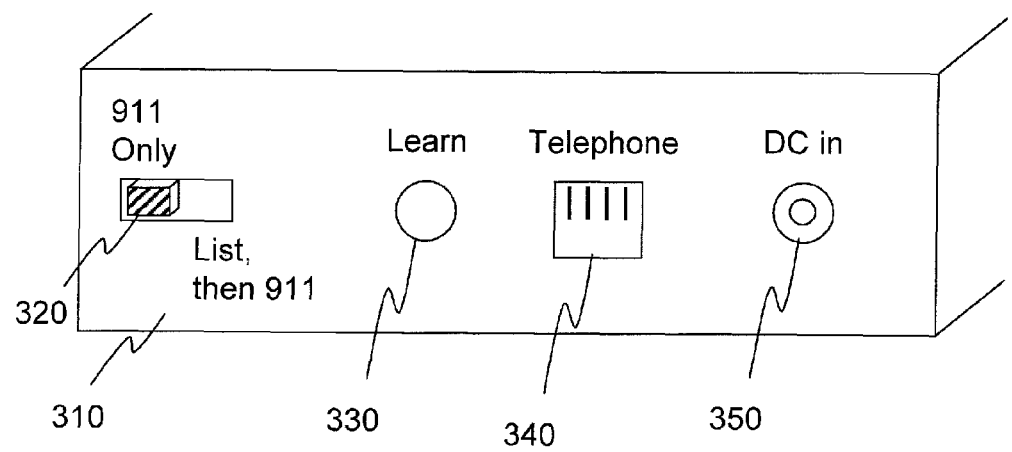
FIG. 3 is a rear view of the exemplary base station of FIG. 1.

As shown in FIG. 3, the exemplary base station 100 may include an exterior panel (e.g., rear panel 310) which allows interaction with various functions. For example, the rear panel 310 is illustrated as including a switch 320 which can select a calling mode of the base station 100 when the portable transceiver 200 is activated. Also illustrated are the jack 340 for connecting to the phone line and a DC input 350 for receiving power from an AC-to-DC converter (not shown). Alternatively, the base station 100 may include an internal transformer and therefore connect directly to the wall outlet. The base station 100 also preferably includes a battery back-up (e.g., a rechargeable battery back-up) for allowing the base station 100 to communicate with the portable transceiver even during a power outage. Internal to the base station is circuitry (1) for being able to communicate with a telephone network (e.g., a private branch exchange (PBX) or the public-switched telephone network (PSTN), a cellular network or a voice-over JP network) and (2) to exchange voice and/or other information (e.g., button press information, unit ID information, or status information about the transceiver 200 such as battery level information).

As illustrated, the switch 320 can select between (1) directly dialing an emergency services number (e.g., 911) or (2) first dialing at least one number stored in a list before dialing an emergency services number. In order to learn the numbers to be stored in the list, the rear panel 310 is illustrated as including a button 330 which sets the base station 100 into a "learning" mode. The base station 100 then detects the telephone number or numbers which are entered via DTMF tones from a conventional wired or cordless telephone device connected to the same phone line as the base station 100. For example, in a configuration of a base station 100 that only expects to receive a single, alternate number, after the button 330 is activated, the base station 100 listens and detects that the user has entered 7035551212#. This identifies that the alternate number (i.e., the number to call before the emergency services) is 703-555-1212. Alternatively, in a configuration of a base station 100 that expects to receive a list of numbers that can be used as alternate numbers, the user may enter a sequence of numbers separated by another special key. For example, when the "*" key is selected as the special key, the user may enter 7035551212*2025551212#. This would cause the base station 100 to store two numbers (i.e., 703-555-1212 and 202-555-1212) and to stop storing numbers after it received the "#" key.

While the switch 320 is illustrated in FIG. 3 as a physical switch, the switch 320 may instead be a programmable switch internal to the base station 100 which is configured by a particular sequence of DTMF tones from a telephone dialpad.

Figure 4:
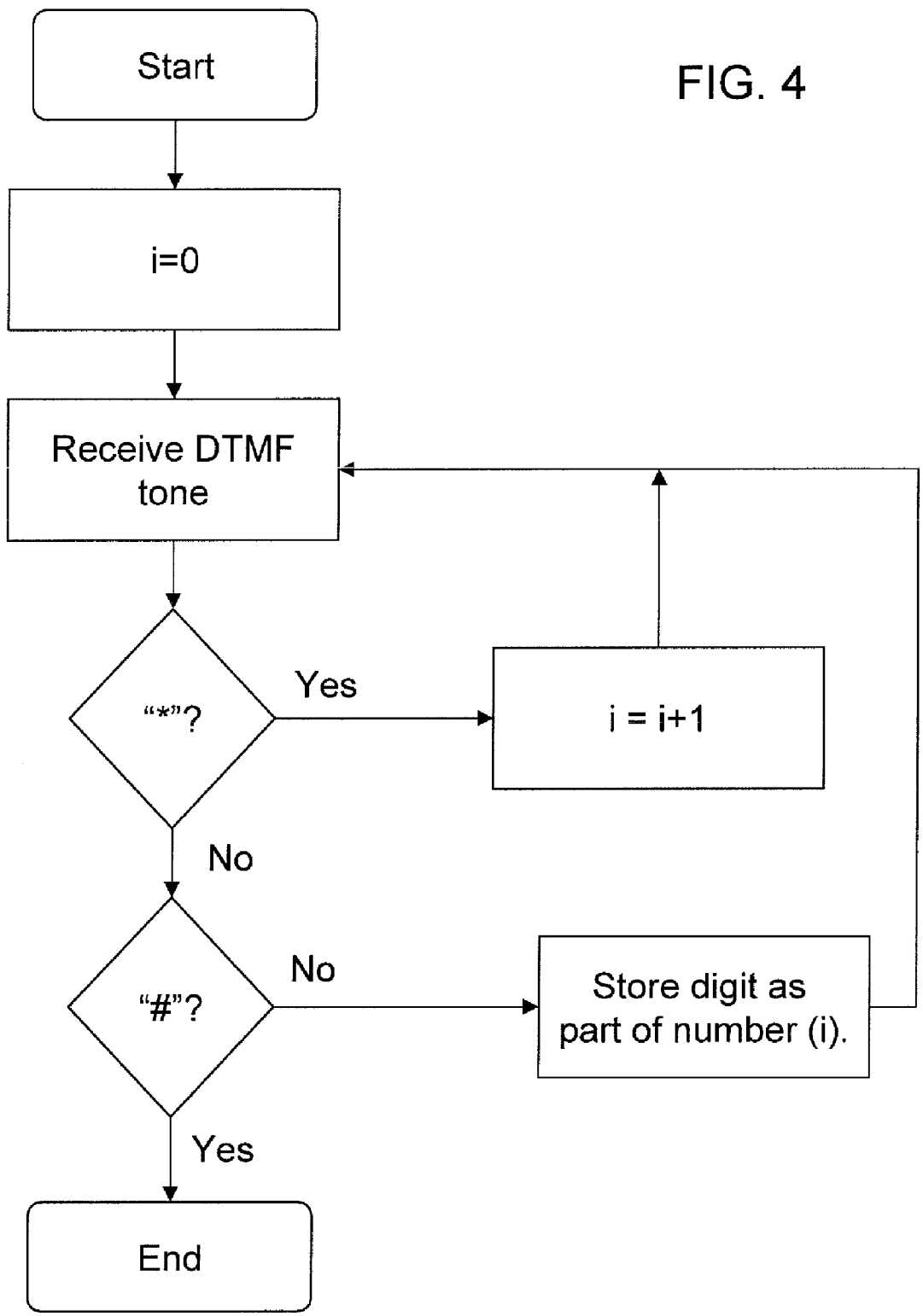
FIG. 4 is a flowchart of an exemplary configuration process to facilitate communicating with an automatically called party.

An exemplary "learning" process is illustrated in FIG. 4. In FIG. 4, a list of numbers is initialized to start at index i=0. When a key is received and it is the "i*" key, then the system advances to the next index in the list, i.e., the index "i+1", and then continues to receive additional digits. If when a key is received it is not the "*" key, then the system determines if it is the "#" key. If it is the "#" key, then the system has completed the process of configuring the list of alternate numbers. If the key is not the "#" key, then the received digit is simply added to the end of the current alternate number. For example, when the partial number "555" has already been stored and a "1" is received, the "1" does not signal the beginning of a new number and does not signal the end of learning, so the "1" is added to the existing partial number to make "5551". The base station may also "time out" after a specified period of time if the programming of the number is not completed. The base station can announce the error and be reprogrammed after the button 330 is pressed again.

If the switch 320 is in "emergency services only" mode, when the portable transceiver 200 is activated, the base station 100 (e.g., using an internal processor and tone generator) directly dials the emergency services number (e.g., 911). If, however, the switch 320 is in list mode, and if a list has actually been programmed, then the base station 100 would dial the first number in the list upon activation of the portable transceiver.

When the base station calls a number in the list, several possible outcomes can occur, and the base station 100 determines what further processing, if any, is required under that condition. For example, if the dialed number is busy and there are other numbers on the list, then the base station 100 hangs up and dials the next number in the list. Alternatively, if the dialed number is busy and there are no more numbers on the list, then the base station 100 dials the emergency services number. In yet another configuration, the base station 100 may be configured to retry a busy number a specified times in a specified period of time before moving on to a next number in the list or to the emergency services number.

Similarly, if the dialed number does not answer and there are other numbers on the list, then the base station 100 hangs up and dials the next number in the list. Alternatively, if the dialed number does not answer and there are no more numbers on the list, then the base station 100 dials the emergency services number. In yet another configuration, the base station 100 may be configured to retry non-answering number a specified times in a specified period of time before moving on to a next number in the list or to the emergency services number.

If the dialed number answers, then the user of the portable transceiver can speak with the callee to identify what the problem is by speaking into the speakerphone 220. (The voice is then transmitted from the speakerphone 220 to the base station 100 in one or more formats, e.g., analog, digital or computer-communication-based (such as any of the 802.11 families of protocols or a mesh network-based protocol such as ZigBee.)) If, for example, the person has dropped his/her cane and cannot reach it, but the person is not in danger, then emergency services might not be necessary if the callee can come over to help. Accordingly, when calling numbers on the list (but not when calling the emergency services number), the base station 100 can play a recorded message to the callee (and the portable transceiver) indicating that if the callee is going to handle the situation, then the callee should so indicate (e.g., by pressing a key on the telephone keypad to create a particular DTMF tone, such as the tone corresponding to the "1" key) within a particular period of time (e.g., 30 seconds). (The user of the transceiver 200 can likewise provide other information by voice which may help the callee know if the callee is capable of providing the needed help.) Upon confirming that the callee is going to handle the situation, the base station 100 would set its call status to "handled" and halt the process of dialing the emergency services number.

The recorded message can be a pre-recorded message from the factory (such as "Your number has automatically been dialed by a Personal Panic Notification Device, please push 1 on your phone's dialpad in the next 30 seconds to handle the situation yourself otherwise the 911 emergency operator will be dialed.") The recorded message could alternatively be recorded by the user of the transceiver 200 (e,g, when the callee's number was stored or when a button or key combination is activated). For example, the user could record (through the transceiver 200 or through a telephone handset) in his/her own voice, "Sonny, it's Dad. You are being called by my Personal Panic Notification Device. Push 1 on the keypad if you can help me." The recorded message would then be played back when the callee answers. The base station 100 can even record a different message for each of the numbers recorded in the list and play back the number-specific message depending on which one of the numbers answers. When the base station 100 calls emergency services, no message is played during the call since emergency services always answer and is able to handle emergencies.

If the callee does not indicate within the configured period of time that he/she is going to handle the situation (e.g., if the call was actually answered by a child or an answering machine), then the base station 100 remembers a status of "unhandled" and hangs up and dials any remaining numbers on the list and finally dials the emergency services number if there are no more numbers on the list. Similarly, if the callee explicitly indicates that it will not handle the call (e.g., by pressing "#"), then the base station 100 remembers a status of "rejected" and hangs up and dials any remaining numbers on the list and finally dials the emergency services number if there are no more numbers on the list.

Alternatively, if the callee believes that the situation is time-critical, the callee can also indicate that to the base station 100 by activating a different key or keys (e.g., by using the "*" key or by dialing "911") while connected to the base station. In that case, the base station would hang-up and dial the emergency services number. For lines that support three-way calling, the base station 100 can be configured to "flash" the line, call the emergency services number, and then "flash" a second time so that the alternate number can be on the call with emergency services and the user of the portable transceiver. This may be beneficial in the case of a user of the portable transceiver that has trouble remembering important medical history or that has trouble communicating in the language of the emergency services personnel. The user of the transceiver may also terminate a conversation with a callee (e.g., by depressing and holding the activation button 210 for a termination threshold period of time (such as 5 seconds) or by repeatedly pressing the activation button 210 a termination number of times (such as 5 times) in quick succession). Such a termination may further cancel any attempts to reach any other person(s) on the list and the emergency services number is called after the hang-up operation with the callee has completed.

In one embodiment of the portable transceiver, the speaker may be used to announce to the user the battery level of the transceiver. For example, when the battery reaches below 25%, the user may be warned to change or charge the battery. Similarly, the portable transceiver may announce the battery level once a day at a specified time. The base station 100 may also include a button (not shown) that, when activated, sends a message to the portable transceiver and causes it to announce its battery level.

In an embodiment of the base station 100 which may be connected to a private telephone switch, the base station may analyze the numbers in the list to determine if the first digit indicates that an outside line is needed. For many phones, this is represented by a "9" in the first digit. If the base station 100 detects from the number (or from having been otherwise configured, such as by using DTMF tones) that a delay is needed, the base station 100 waits a short period of time after dialing the first digit before dialing the rest of the number.

Similarly, the base station 100 can be configured (e.g., using DTMF tones) to always dial a number (e.g., "9") to signal an outside line before dialing the alternate numbers or the emergency services number.

The base station 100 can also be configured to respond differently to different uses of the activation button 210 on the portable transceiver 200. For example, if the user of the transceiver 200 pushes and holds the button 210 for a certain length of time or pushes the button 210 several times in quick succession, then an override detector in the base station 100 controls the base station 100 to skip over dialing the alternate numbers in the list and dials the emergency services number immediately, regardless of the state of the switch 320.

Because the transceiver 200 includes a speakerphone 220, the base station 100 can provide the user with voice prompts to walk the user through dialing the 911 emergency operator or the numbers on the list. For example, the base station 100 could play through the speakerphone 220 the message "push and hold the button for three seconds to dial the numbers on your calling list, or push the button and release it to dial the 911 emergency operator." The base station 100 would then respond to the operation of button 210 according to the played message.

Alternatively, a transceiver can be configured with two separate buttons—a "911" button and a "Friend" button—each one corresponding to a different dialing procedure. The buttons may be differently colored and shaped.

In yet another embodiment, a base station 100 connects to both the line 1 and line 2 of the phone line. When the user pushes the button 210, a call goes through to the emergency services (e.g., 911) operator on line 1 while the base station also dials out on line 2 to the numbers stored in the list. Like in the single line embodiment, a recorded message can be played to the non-emergency services number indicating that the user has pushed the panic device and that 911 is being called on the other line. The base station 100 can then act as a bridge between the two calls.

The base station 100 may also be configured to communicate cordlessly with the user's home phone network. For example, there are known cordless phone systems that include a single cordless phone base station and multiple handsets. The base station 100 can be constructed to act as one of the multiple handsets such that the base station 100 would not need a telephone jack 340.

In yet another configuration, the transceiver 200 can be implemented as a cordless phone handset and the dialing of a list of numbers and an emergency services number can be integrated into a conventional cordless phone base station.

The base station 100 may also be configured to listen to calls made from the telephone handset attached to the base station 100. If the base station 100 detects that the handset has made a call to an emergency services number (e.g., 911), then the base station 100 may, after the call to the emergency services number is terminated, dial at least one number in the list of numbers that can be used as alternate numbers, preferably running through the list until an answer is received. When calling the non-emergency services callee from the list, a factory-recorded voice message or a user-recorded message can then be played to the callee to indicate that the emergency services number was recently called. In his way, even if the pendant is not used to initiate the call, a third party (e.g., a relative or friend) can be notified such that he/she is aware that an emergency request was made. The base station 100 may also be configured to listen to calls made from a telephone handset not attached to the base station 100. The base station 100 may additionally include a transmitter for activating the transceiver 200 to turn on voice communications and thereby enable voice communications between a callee and the user. The base station 100 may activate the transceiver for voice communication before, during or after the process of calling the numbers on the list has begun.

In an alternate configuration, the base station 100 may be a computer (such as a personal computer) which communicates with the transceiver 200 using a computer communications protocol (e.g., a WiFi standard such as the 802.11 family of standards, WiMax or Bluetooth). In such a configuration, the base station 100 may make one or more calls using a conventional telephone interface (i.e., using a PSTN interface) and/ or may make one or more calls using a voice-over IP protocol via the Internet. In such a configuration, the base station 100 may be configured to notify (or contact) third parties using additional communications techniques, such an instant messaging, email, paging messages, short message service (SMS) messages and voice-over IP calls or messages. The circuitry and/or software for making such contacts will be referred to herein as a "notifier."

While the above discussion has been given with respect to the base station 100 being activated by a transceiver 200, the base station 100 can also be activated by a number of other conditions. For example, when the base station 100 detects that the battery of the base station 100 or the transceiver 200 is running low, the base station 100 may dial out to the list of alternate numbers to tell at least one person on the list the condition of the battery. The callee may be informed about the battery condition using either a factory pre-recorded message or a personalized recorded greeting. The message may even include an announcement about the type of battery (e.g., AAA) that is needed to effectuate the replacement. The base station 100 may also provide a first audible or visual indication (e.g., a beeping noise or a flashing light) to notify people close to the base station 100 that the base station 100 is running on battery power and/or a second audible or visual indication that the battery needs replacing (e.g., if the power has been off for an extended period of time).

The base station 100 may further continue to check the status of the battery periodically to ensure that the battery is actually replaced. If the base station 100 determines that the battery has not been replaced after a specified period of time, the base station 100 can again call the list of alternate numbers to report the unchanged battery condition.

Likewise, the base station 100 may detect a length of use of the pendant during an emergency call and may perform battery status checks more frequently after long uses of the pendant. For example, the base station 100 may perform a battery status check every 24 hours for a few days after an extended call using the pendant.

The base station 100 may further perform self check operations during periods of inactivity. For example, periodically (e.g., every hour or two hours) the base station 100 attempts to take the telephone line off-hook to determine if the phone line is working properly. If voice or a dial tone is detected, then the base station 100 knows that the telephone line is working properly. If, however, there is no voice signal and no dial tone, then the base station 100 will begin to track how long the condition persists. If it persists longer than a specified period (e.g., longer than 12 or 24 hours), then an audible or visual indication would be provided either through the transceiver 200 or through the base station 100.

As used herein, the "processor" internal to the base station 100 that controls the configuration of the base station and the dialing of numbers may be any one or a combination of a microprocessor, an application specific integrated circuit, a field programmable gate array or any other logic device and may be referred to as circuitry or generally as a device. The configuration information stored in the base station 100 can be stored in volatile memory (e.g., RAM) or non-volatile memory (e.g., flash memory) or in a combination of both. The battery back-up may be configured to protect from loss information stored in volatile memory.

While certain configurations of structures have been illustrated for the purposes of presenting the basic structures of the present invention, one of ordinary skill in the art will appreciate that other variations are possible which would still fall within the scope of the appended claims.

The invention claimed is:

1. An emergency services automatic dialing device, comprising:
   a wireless receiver for receiving, from a portable transceiver, a signal indicating that a panic button has been pushed and for receiving speech from a user of the portable transceiver;
   a memory for storing a list of at least one alternate number that may be called before dialing an emergency services number;
   a dialer for calling the at least one alternate number in the list before dialing the emergency services number;
   a detector for detecting a status of the call to the at least one alternate number in the list, wherein the dialer dials the emergency services number if the detector does not detect that a callee at the at least one alternate number in the list has indicated that the emergency services number does not need to be called;
   a voice transmitter for providing speech from the user of the portable transceiver to the callee upon the callee answering a call; and
   a message playback device configured to play a recorded message to the callee of the at least one alternate number in the list and configured not to play any message after the emergency services number has been called.

2. The emergency services automatic dialing device as claimed in claim 1, further comprising a switch for determining if at least one number in the list should be called before dialing an emergency services number.

3. The emergency services automatic dialing device as claimed in claim 2, further comprising an override detector for controlling the dialer to ignore the setting of the switch and dial the emergency services number without first dialing any numbers from the list.

4. The emergency services automatic dialing device as claimed in claim 3, wherein the override detector comprises a detector for detecting how long a button on a radio pendant is held down before releasing the button.

5. The emergency services automatic dialing device as claimed in claim 3, wherein the override detector comprises a detector for detecting how many times a button on a radio pendant is pushed in a period of time.

6. The emergency services automatic dialing device as claimed in claim 1, wherein the detector detects an unhandled status of a call to a first number in the list and controls the dialer to hang-up and dial a second number in the list prior to calling the emergency services number.

7. The emergency services automatic dialing device as claimed in claim 6, wherein the unhandled status of the call to the first number comprises a status of (1) no answer, (2) busy, (3) answered but not handled or (4) rejected.

8. The emergency services automatic dialing device as claimed in claim 1, further comprising a message playback device for playing a recorded message to the callee requesting the callee identify whether the emergency services number need not be called because the callee will handle the call.

9. The emergency services automatic dialing device as claimed in claim 1, wherein the detector detects programming of the list of at least one alternate number using DTMF tones from a telephone connected to a phone line of the emergency services automatic dialing device.

10. The emergency services automatic dialing device as claimed in claim 1, wherein the detector detects programming of the list of at least one alternate number using DTMF tones from a telephone connected to the emergency services automatic dialing device.

11. The emergency services automatic dialing device as claimed in claim 1, wherein the dialer comprises a delay device for pausing after dialing a digit indicative of seizing an outside line before dialing remaining digits in a corresponding one of the at least one alternate number.

12. An emergency services automatic dialing device, comprising:
- a wireless receiver for receiving, from a portable transceiver, a signal indicating that a panic button has been pushed and for receiving speech from a user of the portable transceiver;
- a memory for storing a list of at least one alternate number that may be called in addition to dialing an emergency services number;
- a dialer for calling the at least one alternate number in the list and for dialing the emergency services number and bridging together the calls to the at least one alternate number in the list and the emergency services number;
- a voice transmitter for providing speech from the user of the portable transceiver to the callee upon the callee answering a call; and
- a message playback device configured to play a recorded message to the callee of the at least one alternate number in the list and configured not to play any message after the emergency services number has been called.

13. The emergency services automatic dialing device as claimed in claim 12, wherein the dialer comprises circuitry for flash hooking a telephone line in order to separately dial the at least one number in the list and the emergency services number and then join together the calls to the at least one number in the list and the emergency services number.

14. The emergency services automatic dialing device as claimed in claim 12, further comprising a detector for detecting an unhandled status of a call to a first number in the list and controlling the dialer to hang-up and dial a second number in the list prior to calling the emergency services number.

15. The emergency services automatic dialing device as claimed in claim 1, wherein the list of at least one alternate number comprises a list of a plurality of alternate numbers, and wherein the message playback device is configured to play a recorded message to callees of each of the plurality of alternate numbers.

* * * * *